(12) United States Patent
Kentley-Klay

(10) Patent No.: US 10,457,179 B1
(45) Date of Patent: Oct. 29, 2019

(54) IMMERSIVE VEHICLE SEATS

(71) Applicant: Zoox, Inc., Menlo Park, CA (US)

(72) Inventor: Timothy David Kentley-Klay, Menlo Park, CA (US)

(73) Assignee: Zoox, Inc., Foster City, CA (US)

( * ) Notice: Subject to any disclaimer, the term of this patent is extended or adjusted under 35 U.S.C. 154(b) by 29 days.

(21) Appl. No.: 15/803,346

(22) Filed: Nov. 3, 2017

(51) Int. Cl.
*B60N 2/879* (2018.01)
*B60N 2/00* (2006.01)
*B60N 2/90* (2018.01)

(52) U.S. Cl.
CPC .............. *B60N 2/879* (2018.02); *B60N 2/002* (2013.01); *B60N 2002/981* (2018.02)

(58) Field of Classification Search
CPC .. B60N 2/879; B60N 2/002; B60N 2002/981; G08B 6/00
See application file for complete search history.

(56) References Cited

U.S. PATENT DOCUMENTS

| | | | |
|---|---|---|---|
| 6,991,289 B2 | 1/2006 | House | |
| 8,527,146 B1 * | 9/2013 | Jackson | B60W 50/0098 180/273 |
| 2013/0342365 A1 * | 12/2013 | Kiefer | B60Q 9/008 340/901 |
| 2014/0348354 A1 | 11/2014 | Christoph et al. | |
| 2016/0318442 A1 * | 11/2016 | James | B60Q 9/00 |
| 2016/0347329 A1 * | 12/2016 | Zelman | B60W 50/16 |
| 2018/0321678 A1 * | 11/2018 | Valeri | G05D 1/0088 |

OTHER PUBLICATIONS

Chevrolet's Safety Alert Goes to Work, Gm Corporate Newsroom, http://media.gm.com/content/media/us/en/gm/home.detail.html/content/Pages/news/us/en/2015/Jan/0116-safety-alert-seat.html, 2 pages, Jan. 2015.
Heptic Seat Tech Offers Good Virations, Pickup Trucks.com News, http://media.gm.com/content/media/us/en/gm/news.detail.html/content/Pages/news/us/en/2013/Apr/0430-sierra.html, 10 pages, Apr. 2013
Individual Sound Zones (ISZ) by Harman, retrieved on Jan. 4, 2018 at http://www.individualsoundzones.com/ 4 pages.

* cited by examiner

*Primary Examiner* — Michael J Zanelli
(74) *Attorney, Agent, or Firm* — Lee & Hayes, P.C.

(57) ABSTRACT

An immersive seat system may include audio outputs and/or haptic outputs configured to provide an occupant of an autonomous vehicle with an enhanced user experience. For example, the audio outputs and/or the haptic outputs may be controlled to provide a more enjoyable experience while riding to destination, and/or to provide information to the occupant about the vehicle in which the occupant is riding, objects in a proximity of the vehicle, actions to be taken by the vehicle, events involving the vehicle, environmental conditions, and/or other information.

20 Claims, 8 Drawing Sheets

IMMERSIVE VEHICLE SEATS

BACKGROUND

Many people spend relatively large amounts of time traveling between destinations. Conventional vehicles may include in-vehicle information systems, e.g., navigation capabilities, and in-vehicle entertainment systems, e.g., radios, DVD-players, and the like.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
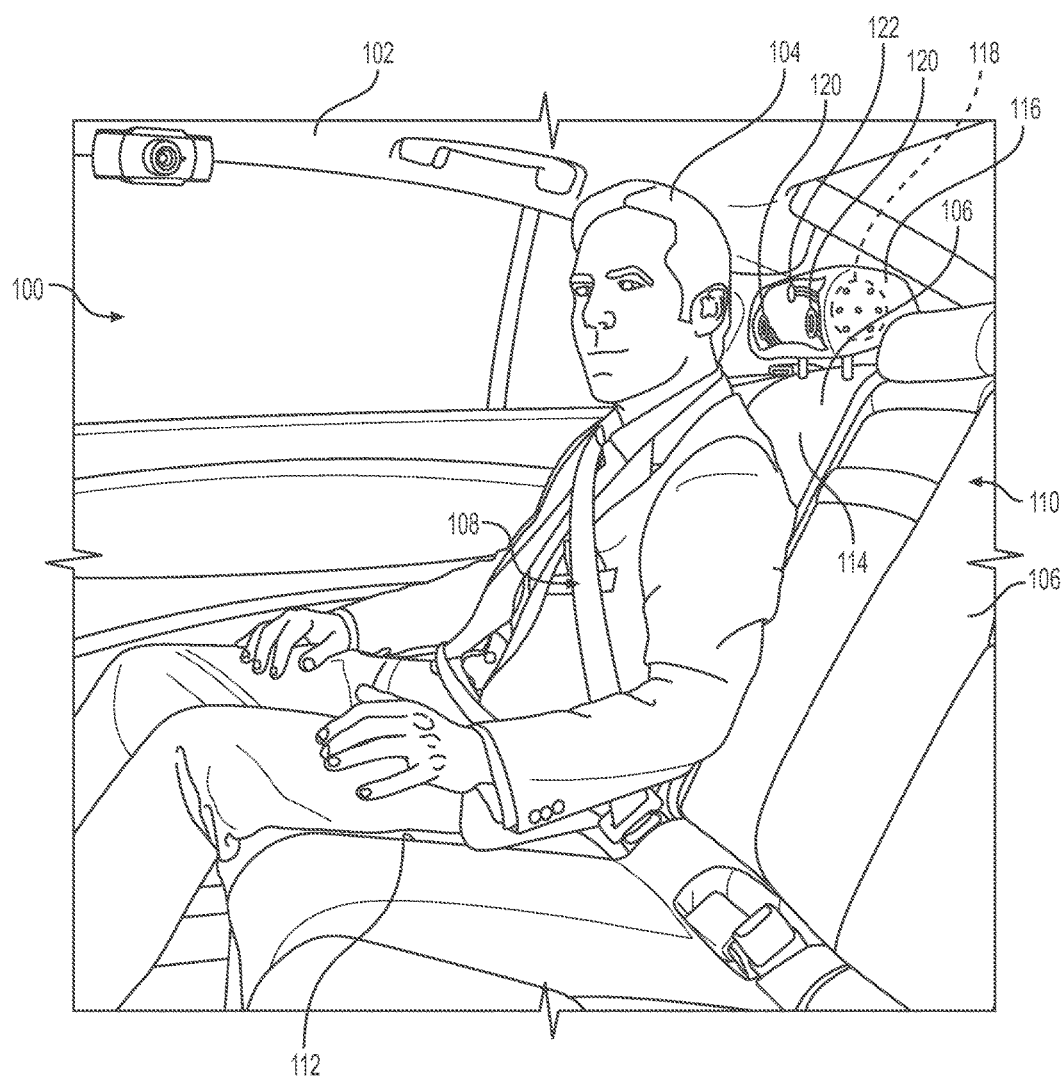
FIG. 1 is a partial cut-away, perspective view of an interior of a vehicle including an immersive seating system according to some examples of the present disclosure.

Example vehicles, such as example autonomous vehicles, may include one or more immersive seats. According to some example implementations of this disclosure, the immersive seats may include audio outputs and/or haptic output elements. The audio outputs and/or the haptic elements may be controlled to enhance the experience of the occupant of the vehicle seat. In some examples, the audio output and the haptic output elements may be personalized for the occupant, with the outputs therefrom being imperceptible to other occupants of the vehicle. For instance, the audio outputs may be configured for enjoyment only by the occupant of the seat, and the haptic outputs may provide tactile sensations only at surfaces contacting the occupant. The audio and or haptic outputs may provide an enhanced user experience by providing desirable sensations to the occupant in the seat. In other implementations, the audio output and/or the haptic output elements may additionally or alternatively be used to convey information to the occupant of the seat. Such information may include information about the vehicle in which the occupant is riding, objects in a proximity of the vehicle, actions to be taken by the vehicle, events involving the vehicle, environmental conditions, information about other occupants of the vehicle or potential occupants of the vehicle, and/or other information. For example, the audio and or haptic outputs may be activated, based on sensors, to convey that the vehicle is approaching a destination or that another vehicle is about to impact the vehicle in which the occupant is riding. In some instances, an occupant of one vehicle seat may be able to share her experience with an occupant of another seat.

In some example implementations, haptics and/or audio outputs, e.g., speakers, may be provided for each of a number of seats in an autonomous vehicle. The autonomous vehicle may be a Level 5 autonomous vehicle, such that each of the seats is a passenger seat, i.e., there is no dedicated driver seat because the autonomous vehicle is completely autonomous. The Level 5 classification was issued in 2016 by the U.S. National Highway Traffic Safety Administration, and describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, also including conventional automobiles in which all vehicular control is performed by a driver and vehicles that are partially autonomously controlled, such that they can be autonomously controlled without driver attention or assist during certain driving conditions, such as, for example, while operating on limited-access highways. Such partially autonomously controlled vehicle may require driver attention and/or assistance during other driving conditions, such as, for example, while operating on city streets in urban areas, or during at least some parking functions.

The autonomous vehicle may be configured to traverse through an environment, and may include a number of sensors that sense objects in the environment. Information from the sensors may be used by a perception system to understand attributes of the environment and/or to act on those attributes. For example, attributes of the environment may be used to control movement of the autonomous vehicle, e.g., to change a trajectory of the autonomous vehicle. The attributes of the environment may also be used to control haptics and/or audio outputs, e.g., to convey information about the environment to the passenger. For example, a controller in the autonomous vehicle may control the autonomous vehicle to avoid a detected object, e.g. an animal in the roadway, and may control the haptics and/or audio outputs to alert the passenger to the presence of the object, e.g., because the passenger may be interested in seeing the animal, or bracing for such a maneuver. Whereas the passenger may not have otherwise known the reason the autonomous vehicle performed some maneuver, such a haptic conveyance of information may indicate to a passenger that such a maneuver which deviates from a nominal driving behavior was, indeed, planned. Moreover, the perception system may be configured to classify objects in the environment, and different haptic and/or audio outputs may be associated with different classes or types of objects. As will be appreciated, features of this disclosure may provide passengers with information and/or entertainment, as opposed to conventional applications that alert a driver to various conditions.

The techniques, assemblies, and systems described herein may be implemented in a number of ways. Example implementations are provided below with reference to the following figures.

FIG. 1 is a perspective view of an interior 100 of a vehicle 102 including a passenger or an occupant 104 seated in seat 106. The occupant 104 is restrained in the seat 106 by a seat belt 108. The example vehicle 102 may be configured to travel via a road network from one geographic location to a destination carrying the occupant 104, and in some instances, other occupants. For example, as illustrated, the interior 100 may include a plurality of seats 106, which may be provided in any relative arrangement. For example, in the vehicle 102 the seats 106 are side-by-side, arranged as a row 110 of seats 106. In some examples, multiple rows 110 may be provided and two of the rows 110 of seats 106 may face each other. Other relative arrangements and numbers of seats 106 are contemplated.

In the example shown, each of the illustrated seats 106 includes a seat portion 112 configured to support the majority of the weight of the occupant 104, a seatback 114 associated with the seat portion 112 and configured to support the back of the occupant 104, and a headrest 116 disposed at a top of the seatback 114 and configured to support the head of the occupant 104. Although not illustrated, the seats 106 may also include arm rests, leg rests, or other components that may be conventionally associated with vehicle seats.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. By way of non-limiting example, although the occupant 104 is illustrated as being a passenger in the vehicle 102, the occupant 104 may be a driver, and one of the seats 106 may be a driver's seat.

The example vehicle 102 may include a chassis or frame, and a body disposed on the frame. The body may provide the vehicle with any configuration, such as, for example, a van, a sport utility vehicle, a cross-over vehicle, a truck, a bus, an agricultural vehicle, a construction vehicle, etc. The vehicle 102 may be powered by one or more internal combustion engines, one or more electric motors, any combination thereof, and/or any other suitable power sources. In addition, the example vehicle 102 may include any number of wheels, tires, and/or tracks, such as, for example, four wheels.

In the example shown in FIG. 1, the seat 106 is an immersive seat, including elements to enhance the occupant's travelling experience. For instance, the seat 106 includes one or more speakers 118 (one of which is illustrated) and a plurality of haptic elements 120 (one of which is shown disposed in the headrest 116). The speakers 118 and the haptic elements 120 are integrated into the headrest 116 or other portions of the seat 106 or surroundings of the seat 106 in such a manner that their outputs, i.e., sound output from the speakers 118 and a tactile sensation output by the haptic elements 120 may be perceived by the occupant 104 when seated in the seat 106. One or more sensors 122 also may be associated with the seat. In some implementations, the sensors 122 may detect a presence and/or identify of the occupant 104, for example. Example immersive seats and their components will be described in more detail, below.

Figure 2:
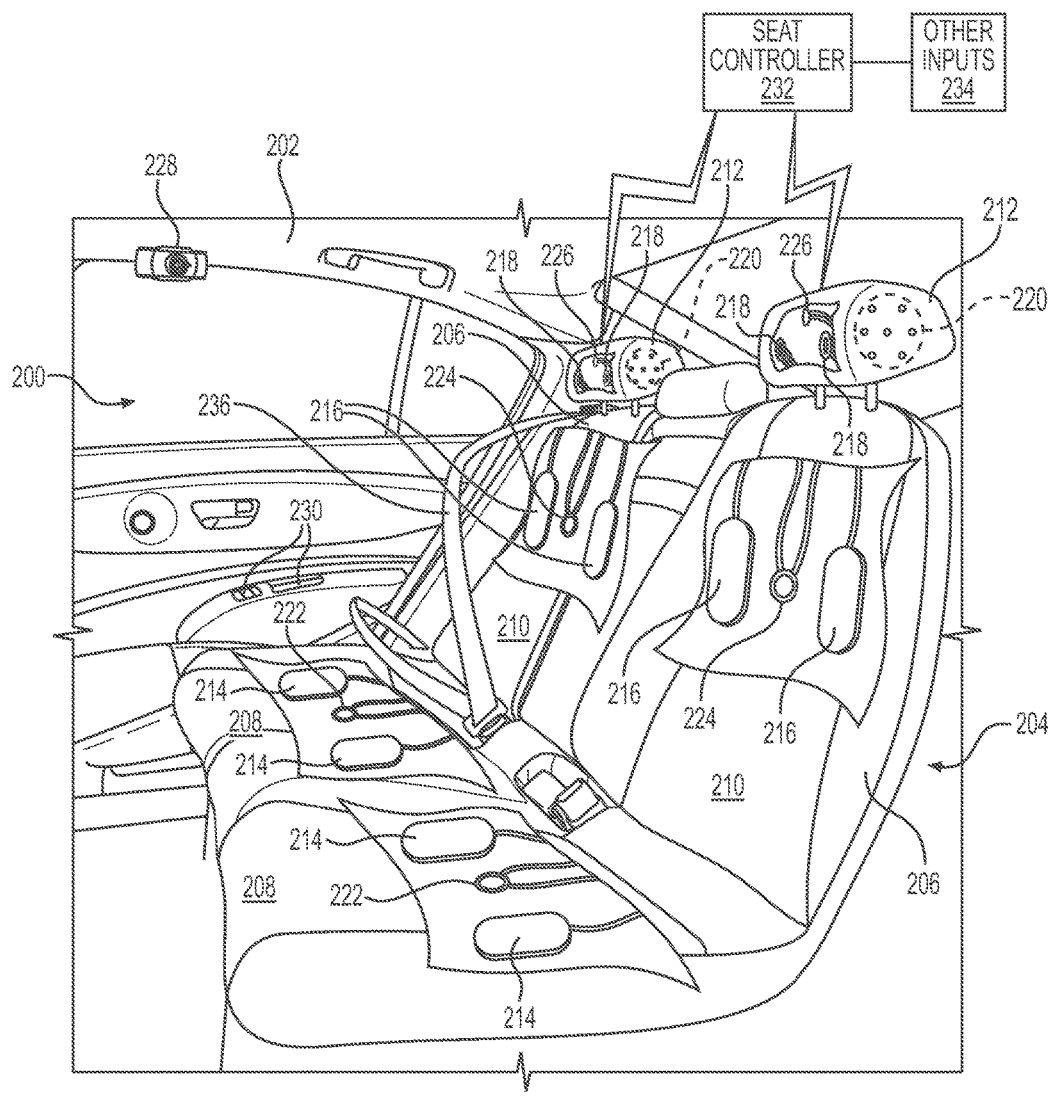
FIG. 2 is a partial cut-away perspective view of an interior of a vehicle including an immersive seating system according to additional example embodiments of the present disclosure.

FIG. 2 illustrates a second embodiment of an interior 200 of a vehicle 202. The vehicle 202 may be the same as the vehicle 102 described above, or may be a different vehicle. The interior 200 of the vehicle 202 includes an immersive seat system 204, components and functionality of which will now be described.

The immersive seat system 204 generally includes one or more seats 206, which may be similar to the seats 106 described above. In the illustrated embodiment, two seats 206 are illustrated, disposed side-by-side to form a row of seats 206. More or fewer seats 206 may be provided, and the configuration is not limited to rows. For example, the seats 206 may be separate from each other, as in a bucket-style seating arrangement. In still other arrangements, the seats 206 may be arranged to face each other, or to be arranged otherwise relative to each other. Each of the illustrated seats 206 includes a seat portion 208, a seatback 210, and a headrest 212. The seat portion 208 is generally configured to support the majority of the weight of an occupant of the seat. For instance, the user may sit on the seat portion 208. The seatback 210 is generally configured to support the occupant's back, and the headrest 212 is generally configured to support at least the back of the occupant's head.

As with the seats 106 discussed above, the seats 206 also include haptic elements for providing haptic output at one or more surfaces of the seat 206. For example, as illustrated in FIG. 2, each of the seats 206 includes one or more seat portion haptic elements 214, one or more seat back haptic elements 216, and one or more headrest haptic elements 218. The seat portion haptic elements 214 are configured to provide a haptic output at the seat portion 208, the one or more seatback haptic elements 216 are configured to provide a haptic output at the seatback 210, and the headrest haptic elements 218 are configured to provide a haptic output perceptible at the headrest 212. Although each of the seats 206 is generally illustrated as containing two of each of the seat portion haptic elements 214, the seatback haptic elements 216, and the headrest haptic elements 218, in other implementations more or fewer haptic elements may be provided. In some implementations, one or more of the seat portion 208, the seatback 210, and the headrest 212 may have more haptic elements, or may have no haptic elements. Moreover, haptic elements associated with a seat 206 may be disposed in an arm rest associated with the seat, in a portion of a seatbelt associated with the seat 206, and/or a floor proximate the seat 206. In general, the haptics (and audio outputs discussed in more detail below) are generally provided at one or more locations that may provide a sensation to the occupant of the seat 206.

As used herein, the term "haptic element" is generally used to refer to any number of elements or configurations that can be used to provide a tactile sensation at an associated portion of the seat 206. For example, a haptic element may include actuators, motors, or other physical elements movable to create a tactile experience, e.g., by moving a fabric associated with the seat 206. For instance, a haptic element of the sort just described may be disposed behind the fabric contacted by the occupant upon sitting in the seat 206. In still other implementations, the haptic element may be integrated into the fabric comprising the surface contacted by the occupant. For instance, haptic materials are conventionally known that can be driven, e.g. by an electrical signal, to create tactile sensation. Persons having skill in the art will understand that other or additional haptic elements may be used to provide a tactile feedback at portions of the seats 206.

In addition to providing a tactile sensation to occupants, immersive seat system 204 may also include an audible experience. As illustrated in FIG. 2, each of the seats 206 also includes an associated speaker 220. In the example embodiment, the speaker 220 is disposed in the headrest 212, configured to emit sound from the headrest 212. The location of the speaker 220 is provided only as an example, as additional speakers may be provided an additional locations, or the speaker 220 may be disposed elsewhere. In some examples, additional speakers may be provided in additional or alternative portions of the seat 206. For example, one or more speakers may be disposed to output sound from the seatback 210, e.g., proximate a top of the seatback 210. In still other embodiments, the speaker 220 may be separate from the seat 206. For instance, speaker 220 may be disposed at a different portion of the interior 200, configured to direct sound generally to an occupant of the seat 206. For instance, speaker 220 may be disposed proximate a roof of the vehicle 202, i.e., above the seat 206. In still other implementations, audio output may be provided via a peripheral device associated with the seat 206. For instance, headphones or a separate speaker may be physically attached to the seat 206, e.g., via an audio jack, or a wireless audio output device may otherwise be associated with the seat 206. In some examples, any of the speakers 220 may be used both to emit sound, as well as to function as haptic elements 214, 216, or 218 (e.g., by emitting frequencies of sound which cause vibrations in the surrounding material in which the speakers 220 are disposed).

As further illustrated in FIG. 2, the immersive seat system 204 may further include one or more of a seat portion presence sensor 222, a seatback presence sensor 224, and a headrest presence sensor 226. In implementations of this disclosure, one or more of the presence sensors 222, 224, 226 may be used to determine that an occupant is seated in the seats 206. Similarly, by placing the sensors 222, 224, 226 at various positions on the seat 206, the immersive seat system 204 may be able to determine information about the occupant seated in the seat 206. For example, the seat portion presence sensor 222 may be a pressure sensor configured to determine a weight of the occupant. In some examples, based on the occupant's weight, the immersive seat system 204 may determine that the occupant is a child. Moreover, in instances where presence of an occupant is detected at the seat portion 208 and at the seatback 210, but not at the headrest 212, a relative height of the occupant may be deemed shorter than an instance in which the occupant is detected by all three of the presence sensors 222, 224, 226. Information about the height of the occupant may be used to infer an age of the occupant, for example.

Presence of the occupant at various portions of the seat 206 may also be useful to provide haptic and/or audio outputs to the occupant. For example, instances where the occupant is contacting both the seat portion 208 and the seatback 210, but not the headrest 212, the immersive seat system 204 may be configured to provide haptic and/or audio outputs at the seat portion 208 and the seatback 210. In this manner, haptic and/or audio outputs will only be provided at those locations in which the occupant is contacting the seat. In other embodiments, fewer than the three illustrated presence detectors 222, 224, 226 may be used. For example, presence may only be detected at the seat portion 208, at the seatback 210, or at the headrest 212.

In other implementations, additional or alternative sensing devices may be used to determine that an occupant is seated in one of the seats 206. For instance, a sensor may be associated with a seat belt 236. When the seat belt 236 is fastened, presence of the occupant may be inferred. FIG. 2 also illustrates an imager 228 disposed in the interior 200 of the vehicle 202. The imager 228 may be configured to generate images of the interior of the vehicle 202, including of the occupant(s). In some examples, the image is generated by the imager 228 may be used to determine physical appearances of the occupant, which may be used to determine age, gender, or other information about the occupant. Moreover, images from the imager 228 may be used in conjunction with signals generated by the presence detectors 222, 224, and/or 226, e.g., to corroborate presence and positioning of the occupant in the seat 206. As will be described in more detail below, images form the imager may also be used to identify specific individual occupants. For instance, images from the imager may be analyzed, e.g., using facial recognition techniques, to determine an occupant's identify. Using this identity, aspects of the vehicle, including of the immersive seat system 204, may be controlled according to stored user preferences.

The immersive seat system 204 may also include one or more user interface elements 230. In the illustrated embodiment, the user interface elements 230 generally include buttons or controls placed proximate the seat 206. Although user interface elements 230 are only illustrated as being associated with one of the seats 206, user interface elements 230 may be associated with each of the seats 206. The user interface elements 230 may be used by an occupant of the seat 206 to control aspects of that seat 206. In some implementations, the occupant uses the user interface elements 230 to send instructions to a seat controller 232, and the seat controller may implement those instructions, e.g., by controlling one or more of the haptic elements 214, 216, 218 and/or the speakers 220. Although in the illustrated embodiment the user interface elements 230 are buttons or other controls integrated into the seat, other features and methods allowing for occupant input may also be used. For example, the user interface elements may be provided at other locations in the vehicle, such as on the door or ceiling. In still further implementations, a device associated with the user may function as the user interface elements. For example, an occupant of the seat may access controls associated with the user interface elements 230 via an application on a personal electronic device, e.g., a smart phone or other wearable device. For example, the personal electronic device may be paired with or otherwise associated the autonomous vehicle to control functions associated with the seat, or instructions may be sent over a wired or wireless network.

In example implementations, an occupant may use the user interface elements 230 to control audio output from the speakers 220. For example, an occupant may interact with the controls to turn an audio output on or off, to select an audio output, and/or to control a volume of the audio output. Similarly, the occupant may interact with the user interface elements 230 to control operation of the haptic elements 214, 216, and/or 218. The occupant may choose which haptic elements 214, 216, 218 should be used as well as a manner in which to operate those elements. In some implementations, an occupant may interact the user interface elements 230 to choose from among various preset control configurations or uses associated with the haptic and/or audio elements. In example configurations, the user interface elements 230 may allow an occupant to select an immersive experience that is tailored toward user entertainment or comfort, to choose to receive information about operation or attributes of the vehicle 202, and/or to share the occupant's experience with other occupants.

As also illustrated in FIG. 2, the immersive seat system 204 may also include other inputs 234 to the seat controller 232. As will be described in more detail below, the other inputs 234 may come from third party user devices, may come from systems associated with the vehicle, or from other sources.

Figure 3:
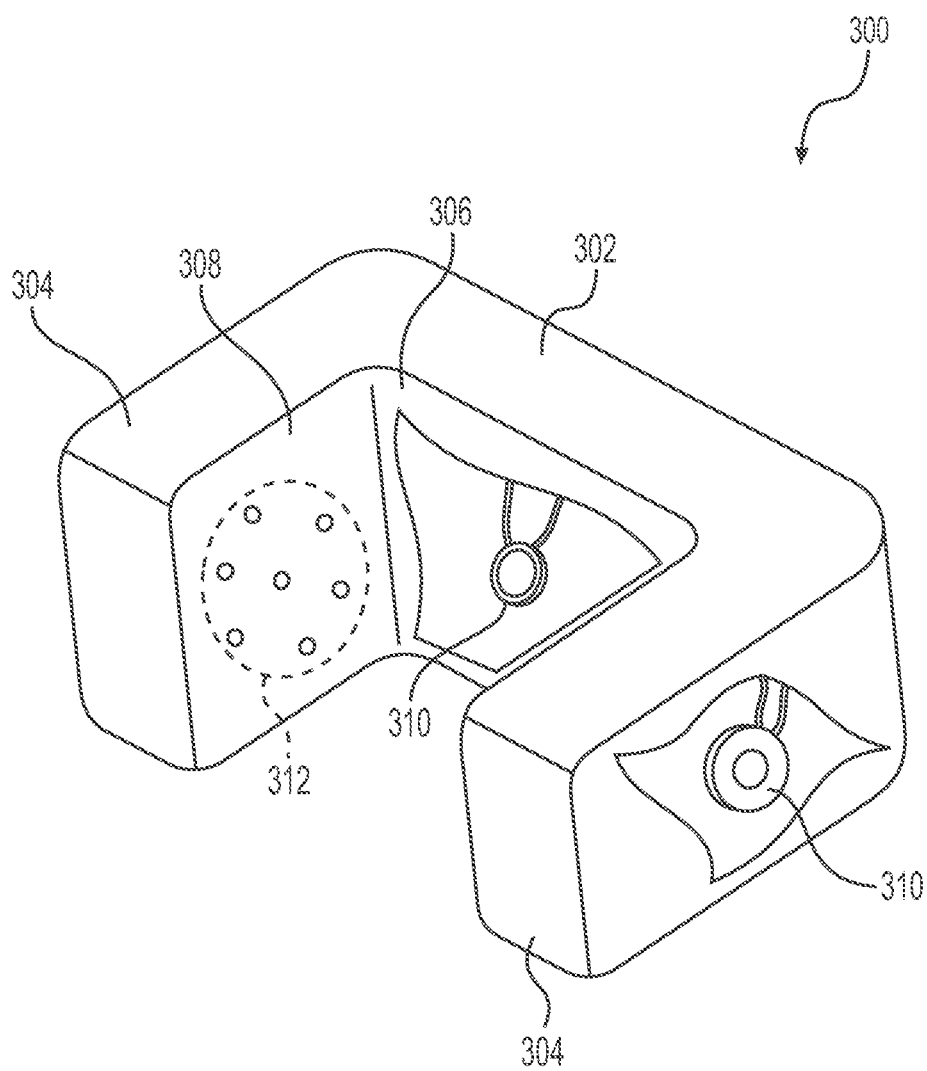
FIG. 3 is a perspective view of a headrest, which may be included in an immersive seating system according to examples of this disclosure.

FIG. 3 is an example of an immersive headrest 300 that may be used as a part of the immersive seat system 204. As illustrated, the headrest 300 includes a main portion 302 generally configured for positioning proximate the back of an occupant's head and side flaps 304 generally configured to be arranged proximate sides of the occupant's head. As illustrated, the main portion 302 may include a back surface 306, i.e., facing the back of the occupant's head, and each of the side flaps 304 may include a side surface 308, i.e., facing opposite sides of the occupant's head. In some implementations, the back surface 306 may be configured to contact the back of the occupant's head and/or the side surfaces 308 may be configured to contact the sides of the occupant's head.

As also illustrated in FIG. 3, the headrest 300 may further include haptic elements 310. The haptic elements 310 may be disposed in the main portion 302 of the headrest 300 and in one or both of the side flaps 304. In some embodiments of this disclosure, the haptic elements 310 are disposed to provide a tactile output on the back surface 306 and/or one or both of the side surfaces 308. For example, when an occupant places her head such that a back of the head contacts the back surface 306 and sides of the head are contacting or proximate the side surfaces 308 of the headrest 300, the haptic elements 310 are operable to provide haptic output's perceptible at the back and/or sides of the occupant's head (e.g., by vibrations or other tactile sensations). Although haptic elements are illustrated as being provided in both the main portion 302 and the side flaps 304, other arrangements are contemplated. For example, haptic elements 310 may be provided only in the main portion 302 or only in one or both of the side flaps 304. Moreover, although only a single haptic element 310 is shown in the main portion 302 and in one of the side flaps 304, additional haptic elements may be provided in any of the main portion 302 or the side flaps 304.

FIG. 3 also illustrates a speaker 312 disposed in the side flap 304. Although only a single speaker 312 is illustrated in one side flap 304, a second speaker may also be disposed in the opposing side flap 304. As will be appreciated, output from the speaker is generally aligned with a position of an occupant's ear when the occupant's head is resting on the back surface 306. Additional speakers may also be provided, for example, in the main portion 302, to output sound from the back surface 306. By providing the speakers 312 in the headrest 300, the present disclosure may allow for a more personalized and immersive experience for the occupant. For instance, the occupant traveling in the seat with integrated headrest 300 may have a personalized experience via the haptic elements 310 and/or the speakers 312. This experience will be exclusive to the occupant, because other occupants of the vehicle will not experience the tactile output from the haptic elements 310 and/or may not hear the audio output from the speaker 312. As above, in some examples, such speakers 312 may also act as the haptic elements 310 by causing vibrations in the surrounding material of side flaps 304.

Figure 4A:
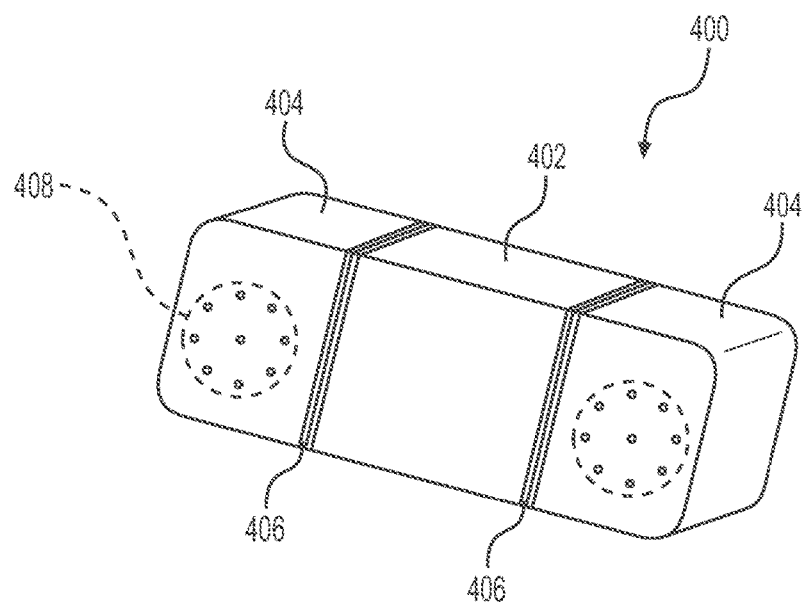
FIG. 4A is a perspective view of another example headrest in a normal position, which may be included in immersive seating system according to examples of this disclosure.
Figure 4B:
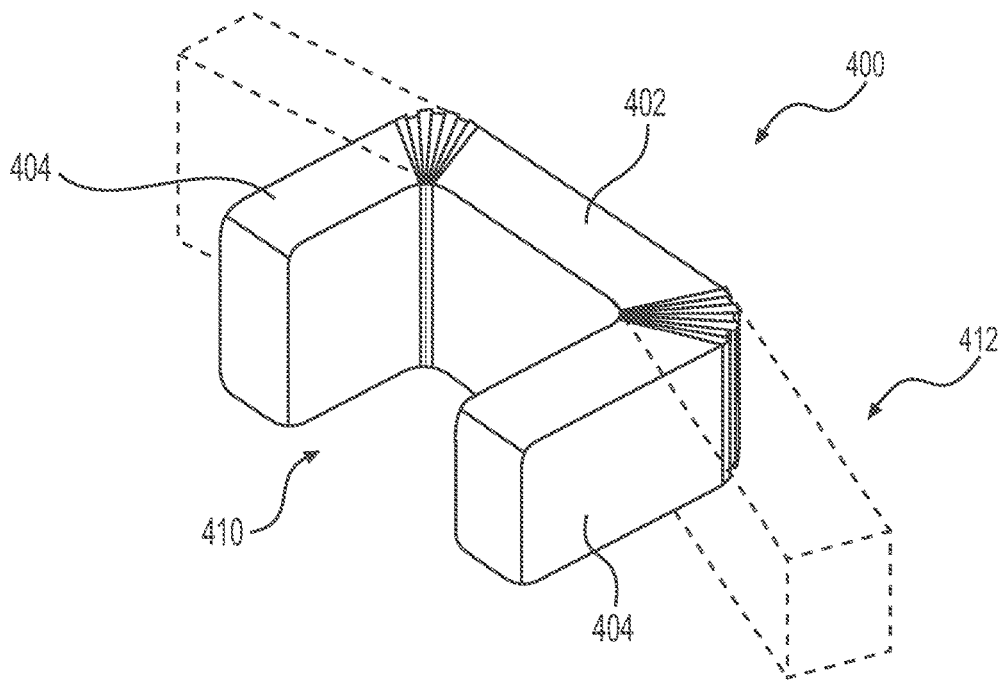
FIG. 4B is a perspective view of the headrest of FIG. 4A, shown in alternative positions.

FIGS. 4A and 4B illustrate another embodiment of the headrest 400, similar to the headrest 300. The headrest 400 is similar to the headrest 300 in that it includes a main portion 402 and side flaps 404. However, the side flaps 404 may be movable relative to the main portion 402. For instance, fold lines 406 are shown as a junction between the main portion and the side flaps, and the side flaps may pivot relative to the main portion at the fold lines 406. As illustrated, speakers 408 may be disposed in the flaps 404, as in the embodiment illustrated in FIG. 3. The headrest 400 may also include haptic elements (not illustrated), which may be similar to or the same as the haptic elements 310 discussed above with reference to FIG. 3. As in previous embodiments, haptic elements may be disposed in the main portion 402 and/or in one or both of the side flaps 404.

FIG. 4A generally illustrates the headrest 400 in a normal or static position. In this position, the main portion 402 and the flaps 404 generally are arranged in a straight line, i.e., the flaps 404 are not angled relative to the main portion 402. In some embodiments, this normal position may be a standard position for the headrest 400, e.g., when the immersive seat system is not being used by an occupant, or no occupant is in the seat associated with the headrest 400. In FIG. 4B, the side flaps 404 illustrated in solid lines are shown as being substantially perpendicular to the main portion 402 of the headrest 400. This configuration may be an immersive position 410. A third position 412 is also illustrated in FIG. 4B, by the side flaps shown in hidden lines. Any number of alternative angular configurations between the normal position shown in FIG. 4A in the immersive position 410 may be achieved via the headrest 400. In other embodiments, the flaps 404 may rotate relative to the main portion 402 by more than 90°, e.g., to accommodate occupants with relatively narrower heads, for example.

In some examples, the flaps 404 may be movable relative to the main portion 402 by physical manipulation by the occupant. For example, the occupant may press, pull, or otherwise interact with the flaps 404 to move them relative to the main portion 402, to achieve a desired position. In other examples, the side flaps 404 may be active. For example, an active flap may contemplate the use of hardware coupled with a computing device such that the computing device may cause the flap to move from one state (i.e. forward or back) to the other. By incorporating one or more sensors in the seating area or the flap portion of the headrest, sensor data may be relayed to a computing device to ensure that the flap is in the same state whenever the seat associated with the headrest is unoccupied. This may be accomplished by connecting the flap to the headrest via springs, spring steel, or embedding the flap with an elastic material having a natural formation. An actuator, such as an electromagnet, may then be used to control the state of the flap (e.g. normal or immersive). In other examples, the actuator may comprise any type of hydraulic, pneumatic, electric, thermal, magnetic, or mechanical actuator.

As contemplated by the examples of FIGS. 1 and 2, the headrest 400 may be coupled to the vehicle seat. However, in some examples, the headrest may be coupled directly to the vehicle body. In other examples, the headrest may be coupled via a compliant coupling such that the compliant coupling can absorb energy from impacts, creating different dynamics and kinematics than if the headrest were directly coupled to the vehicle body. By using such a compliant coupling, passenger safety may be increased. In other examples, other forms of attaching the headrest are contemplated, such as other coupling mechanisms.

Figure 5:
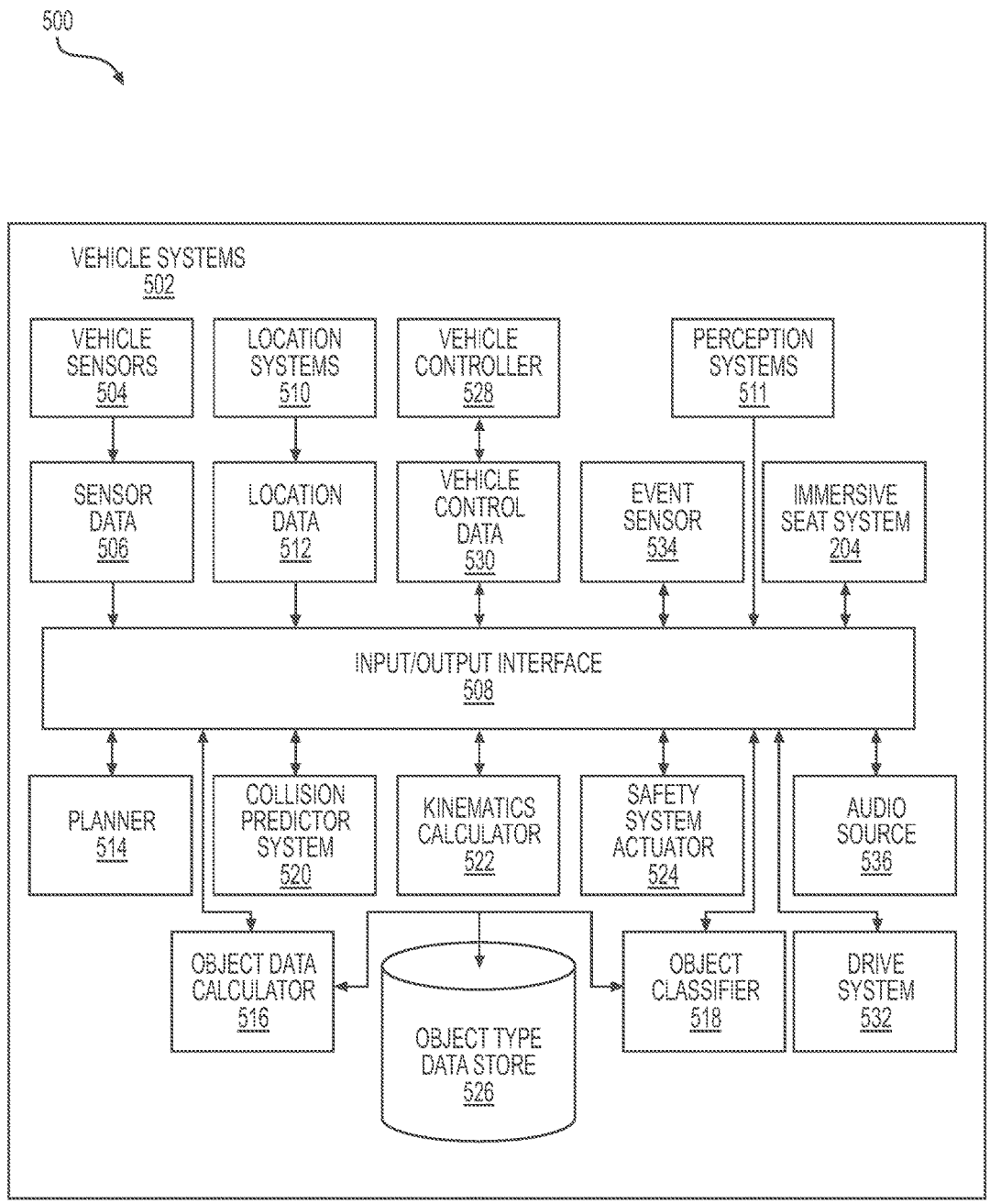
FIG. 5 is a block diagram of an example vehicle systems architecture.

FIG. 5 is a block diagram of an example architecture 500 including vehicle systems 502 for controlling operation of the systems that provide data associated with operation of a vehicle, such as the vehicle 102, 202, and that control operation of the vehicle. In various implementations, the architecture 500 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 500 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 500 shown in FIG. 5, the example vehicle systems 502 include a plurality of vehicle sensors 504, for example, configured to sense movement of the vehicle through the environment, sense environmental data, such as the ambient temperature, pressure, and humidity, and/or sense objects in the environment surrounding the vehicle. In some examples, the vehicle sensors 504 may include sensors configured to identify a location on a map. The vehicle sensors 504 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 504 may also include, for example, inertial measurement units (IMUs), accelerometers, and gyroscopes. The vehicle sensors 504 may be configured to provide sensor data 506 representative of the sensed objects and signals to the vehicle systems 502 via, for example, an input/output (I/O) interface 508. Other types of sensors and sensor data are contemplated.

The example vehicle systems 502 also include location systems 510 and perception systems 511. For instance, the location systems may be configured to receive location information, including position and orientation data (e.g., a local position or local pose) from the vehicle sensors 504 and/or external sources, and provide location data 512 to other portions of the vehicle systems 502 via the I/O interface 508. The external sources may include global satellites for facilitating operation of a global positioning system (GPS) and/or a wireless network for communicating and receiving information related to the vehicle's location, such as map data. The location systems 510 may also include sensors configured to assist with navigation of the vehicle, such as wheel encoders for sensing the rotation of the wheels, inertial navigation sensors, such as gyroscopes and/or accelerometers, and/or cameras for obtaining image data for dead-reckoning navigation.

The perception systems 511 can be configured to perform data analysis on data from the sensors 502, such as segmentation and classification on data form LIDAR, RADAR, and/or image capture devices, to identify and/or classify objects in the environment. In at least one example, the perception systems 511 can determine a size of the object and/or a position of the object in the environment. In an example, the perception systems 511 can also associate identified objects with a map. In some examples, the perception systems 511 can classify objects and associate the objects with a map at substantially the same time. Furthermore, in additional and/or alternative examples, the perception systems 511 can track where an identified object has been and/or estimate where the identified object is going. Objects and associations between objects and a map can be associated with perception data. That is, perception data can identify objects in an environment and attributes associated with those objects. In at least one example, perception data can be used to determine how the vehicle is moving through its surrounding environment.

The example vehicle systems 502 may also include one or more of a planner 514, an object data calculator 516, an object classifier 518, a collision predictor system 520, a kinematics calculator 522, and a safety system actuator 524. The vehicle systems 502 may be configured to access one or more data stores including, but not limited to, an object type data store 526. The object type data store 526 may include data representing object types associated with object classifications for objects detected in the environment.

The example vehicle systems 502 shown in FIG. 5 also include a vehicle controller 528 configured to receive vehicle control data 530, and based on the vehicle control data 530, communicate with a drive system 532 (e.g., a steering system, a propulsion system, suspension system, and/or a braking system) to control operation of the vehicle. For example, the vehicle control data 530 may be derived from data received from one of more of the vehicle sensors 504 and one or more of the planner 514, the object data calculator 516, the object classifier 518, the collision predictor system 520, the kinematics calculator 522, and the safety system actuator 524, and control operation of the drive system 532, so that operation and maneuvering of the vehicle is executed.

In some examples, the planner 514 may be configured to generate data representative of a trajectory of the vehicle, for example, using data representing a location of the vehicle in the environment and other data, such as local pose data, that may be included in the location data 512. For example, the planner 514 may be configured to predict multiple vehicle trajectories based on, for example, probabilistic determinations or multi-modal distributions of predicted positions, trajectories, and/or velocities associated with the vehicle.

In some examples, the object data calculator 516 may be configured to provide data representative of, for example, one or more of the location and/or pose (i.e., position and orientation) of an object in the environment surrounding the vehicle, an object track (e.g., an historical record of previous locations and/or poses) associated with the object, and an object classification associated with the object. For example, the object data calculator 516 may be configured to receive data in the form of sensor signals received from one or more of the vehicle sensors 504 and determine data representing one or more of the location in the environment of the object, the object track, and the object classification. In some examples, the object data calculator 516 or one or more of the vehicle systems 502 may also be configured to determine projected trajectories predicted to be executed by the vehicle. The systems 502 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. Moreover, the systems 502 may be configured to predict more than a single predicted object trajectory.

In some examples, the object classifier 518 may be configured to access data from the object type data store 526, which may be configured to store data representing object types, such as, for example, a species of an object classification, a subclass of an object classification, and/or a subset of an object classification. The object classifier 518, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 520 may be configured to use the data representing the object type, the data representing the trajectory of the object, and/or the data representing the trajectory of the vehicle, to predict a collision between the vehicle and the object.

In some examples, the kinematics calculator 522 may be configured to determine data representing one or more scalar and/or vector quantities associated with motion of objects in the environment, including, but not limited to, velocity, speed, acceleration, deceleration, momentum, local pose, and/or force. Data from the kinematics calculator 522 may be used to compute other data, including, but not limited to, data representing an estimated time to impact between an object and the vehicle, and data representing a distance between the object and the vehicle. In some examples, the kinematics calculator 522 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 522 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle. In some implementations, some or all functionalities described as being associated with kinematics calculator 522 may be performed by other components of the vehicle systems 502, including but not limited to the planner 516.

In some examples, the safety system actuator 524 may be configured to activate one or more safety systems of the autonomous vehicle when a collision is predicted by the collision predictor 520 and/or the occurrence of other safety related events, such as, for example, an emergency maneuver by the vehicle, such as hard braking or a sharp acceleration. The safety system actuator 524 may be configured to activate an interior safety system (e.g., pre-tensioning a seatbelt and/or activating airbags), an exterior safety system (e.g., including warning sounds and/or warning lights), the drive system 532, which may be configured to execute an emergency maneuver to avoid a collision, and/or any combination thereof. For example, the drive system 532 may receive data for causing a steering system of the vehicle to change the travel direction of the vehicle, and a propulsion system of the vehicle to change the speed of the vehicle to alter the trajectory of the vehicle from an initial trajectory to a trajectory for avoiding a collision.

The vehicle systems 502 may operate according to the following example. Data representing a trajectory of the vehicle in the environment may be received by the vehicle controller 528. Object data associated with an object in the environment may be calculated. Sensor data 506 from one or more of the vehicle sensors 504 may be used to calculate the object data. The object data may include data representing the location of the object in the environment, an object track associated with the object, such as whether the object is stationary or moving, an object classification associated with the object, such as whether the object is another vehicle, a pedestrian, a cyclist, an animal, or a stationary object, and/or perception data associated with the object. In some examples, the object data calculator 516, based on the object data, may be used to determine data representing the object's location in the environment, data representing whether the object is moving, and data representing a classification associated with the object.

In some examples, the planner 514 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, a traffic sign, a lane marker, or a fire hydrant, none of which is in motion, are examples of object types with an associated motion data.

In some examples, the collision predictor system 520 may be used to predict a collision between the vehicle and an object in the environment based on the object type, whether the object is moving, the trajectory of the vehicle, the predicted path of the object obtained from the planner 514. For example, a collision may be predicted based in part on the object type due to the object moving, the trajectory of the object being in potential conflict with the trajectory of the vehicle, and the object having an object classification that indicates the object is a likely collision threat.

In some examples, the safety system actuator 524 may be configured to actuate one or more portions of a safety system of the vehicle when a collision is predicted. For example, the safety system actuator 524 may activate one or more safety systems of the vehicle, such as, for example, one or more of the interior safety systems, one or more of the exterior safety systems, and/or one or more of the components of the drive system 532 (e.g., the steering system, the propulsion system, and/or the braking system) via the vehicle controller 528. In some examples, the vehicle controller 528 may determine that the interior safety system will be activated based on some action of an object in the environment, and the vehicle control data 530 may include information configured to cause the vehicle controller 328 to activate one or more functions of the interior safety system, the exterior safety system, and the drive system 532.

In some examples, the vehicle systems 502 may also include an event sensor 534. For example, the event sensor 534 may be configured to receive signals from one or more of the other vehicle systems 502 and determine whether events that may be related to operation of the immersive seating system 204 are occurring. For example, the event sensor 534 may be configured to determine when an occupant first enters the vehicle or to determine that an occupant has requested activation of an audio output and/or of a haptic output and/or has requested a shared immersive experience with another occupant. In some examples, the event sensor 534 may communicate with the immersive seating system 204 via, for example, the input/output interface 508. For example, the event sensor 534 may communicate with the speakers and/or the haptic elements of the immersive seating system, which may be configured to generate an audio output and/or a haptic output at one or more seats based at least in part on an occupant detector determining that the occupant is present and the output of an event sensor 534, for example, as described herein. Other types of events are contemplated.

In additional examples, the immersive seating system 204 may be in communication with other vehicle systems 502 via the input/output interface 508. For example, the immersive seating system 204 may be in communication with the safety system actuator 524, e.g., to provide a haptic and/or audible output informing the occupant of an imminent crash or similar event, the vehicle control data 530, e.g., to provide a haptic and/or audible output informing the occupant that a destination is approaching or has been reached, and/or the vehicle controller 328, e.g., to provide a haptic and/or audible output informing the occupant that a second occupant has requested transportation via the vehicle and/or has occupied a second seat.

Figure 6:
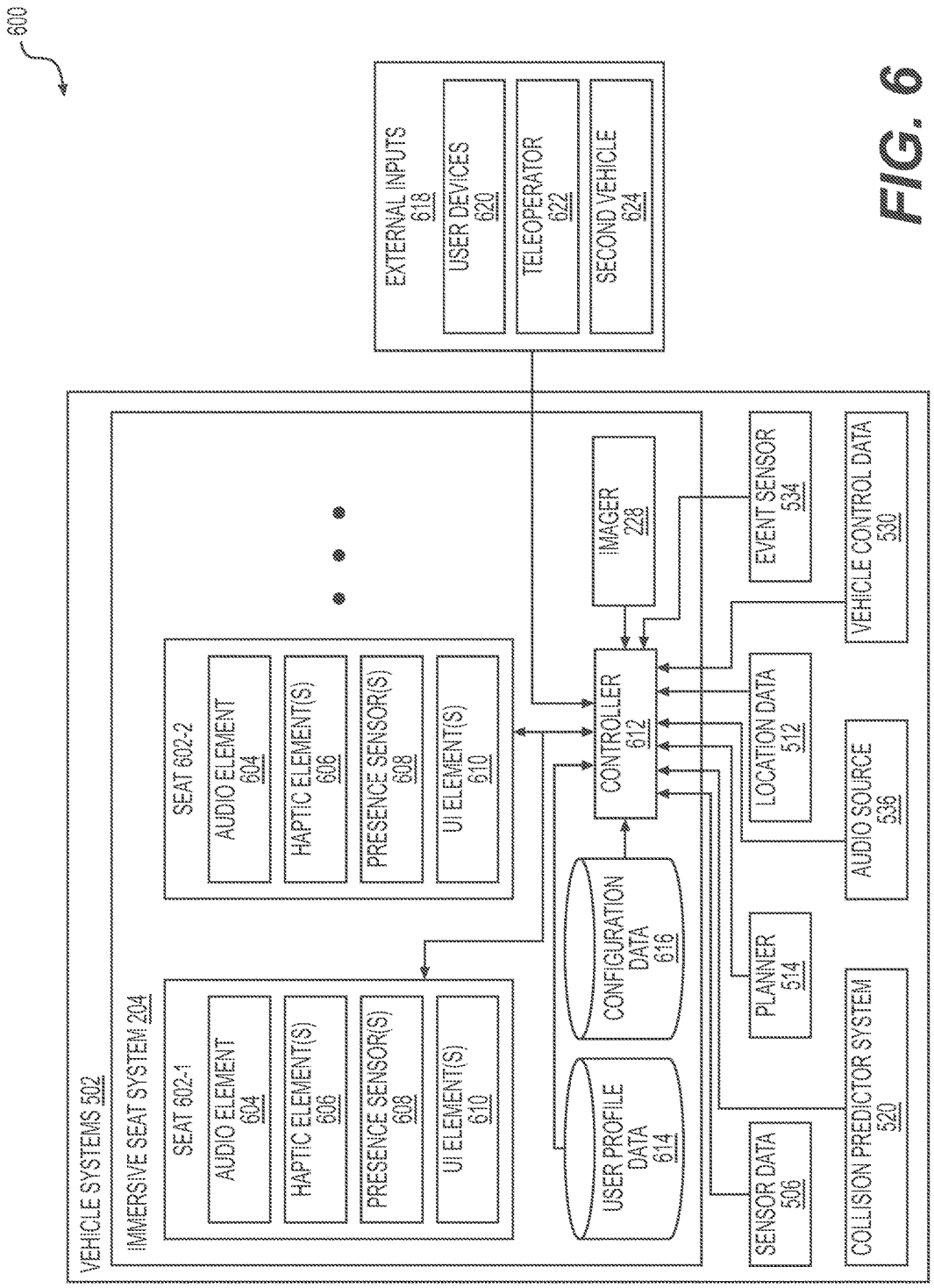
FIG. 6 is a block diagram including an example vehicle systems architecture showing an example immersive seat system architecture.

FIG. 6 shows an example architecture 600 including the vehicle systems 502 and the immersive seat system 204. In the example shown, the immersive seat system 204 includes a plurality of seats 602-1, 602-2 (collectively referred to herein as seats 602). Although two seats 602 are illustrated in the example architecture 600, additional seats 602 may also be provided in the vehicle. Moreover, it is contemplated that only a single seat, such as seat 602-1 or 602-2 may be included. The seats 602 may be the seats 106, 206 discussed above. As noted, the seats 602 may be passenger seats in an autonomous vehicle, not driver seats associated with a driver.

Each of the seats 602 may include an audio element 604, which may be similar to the speakers 118, 220, 312, 408 discussed above. The audio element 604 may be provided in a headrest associated with the seat 602 or in some other portion of the seat 602. In other embodiments, the audio element 604 associated with each of the seats 602 may be provided as a separate, but associated audio element, such as headphones, a portable speaker, or the like. Each of the seats 602 also includes one or more haptic elements 606. The haptic elements 606 may be similar to or identical to the haptic elements 120, 214, 216, 218, 310. Each of the seats 602 also includes one or more presence sensors 608. As with the example presence sensors 222, 224, 226 discussed above, the presence sensor 608 may detect the presence of an occupant in the respective seat 602. For example, the presence sensors 608 may include pressure sensors. The presence sensor 608 may generally detect a presence of an occupant in the seat 602, or may detect that an occupant is contacting specific portions of the seat 602, as detailed above with regard to FIG. 2.

As also illustrated in FIG. 6, each of the seats 602 also includes one or more user interface element(s) 610. The user interface elements 610 may be similar to the user interface elements 230 illustrated in and discussed with reference to FIG. 2. Generally, the user interface element 610 provide a means through which an occupant may control aspects of the seat 602. User interface elements may be buttons, switches, touch sensitive panels, or the like.

As further illustrated in FIG. 6, the immersive seat system 204 also includes a controller 612, which may be similar to the seat controller 232 noted above. The controller 612 generally receives information from a number of different sources, and control aspects of the seats 602. As will be detailed further below, for instance, the controller 612 may send instructions to the one or more of the audio elements 604, the haptic element 606, or the user interface element 610 to provide outputs at the seats 602.

Immersive seat system 204 may further include user profile data 614 and/or configuration data 616. The user profile data 614 may store preferences associated with occupants, for example. For instance, when an occupant is identified as having previously been associated with the vehicle systems 502, data about preferences of the occupant may be stored. In some instances, an occupant may have interacted with the immersive seat system 204 in the past to establish certain preferences relative to haptic outputs, audio outputs, or the like. Upon receiving an input identifying an occupant, the controller may access user profile data 614 to control one or more of the audio element 604, haptic element 606, or the user interface element 610 according to those previously stored preferences. In some instances, the controller 612 may receive information about an identity of an occupant based on the imager 228.

Configuration data 616 may include information associated with pre-stored or preset output configurations. For example, the configuration data may be used to present for example, via the user interface element 610, an occupant with a number of immersive settings available to the occupant. For example, an occupant may be provided with options to receive both haptic and audio output associated with music from some music source, and another option to receive audio and haptic outputs corresponding to certain events associated with the vehicle.

As also illustrated in FIG. 6, the immersive seat system 204, and more specifically, the controller 612 of the immersive seat system 204, may receive additional inputs from other sources. In the illustrated embodiment, the vehicle systems 502, described in more detail above with reference to FIG. 5, may provide some of those additional inputs. For example, the controller 612 may receive information about sensor data 506, about location data 512, or about vehicle control data 530. The controller 612 may also receive inputs from the planner 514, from the collision predictor system 520, from the event sensor 534, and/or from the audio source 536.

The controller 612 may receive additional, external inputs 618. As used herein, the term external inputs is meant to describe inputs that are not a part of the vehicle systems 502. For example, external inputs 618 may include user devices 620, a teleoperator 622, and/or a second vehicle 624. The user devices 620 may include electronic devices associated with an occupant of the vehicle, for example. In some implementations, the occupant may have a personal electronic device running an application useful for interacting with the vehicle systems 502 and/or the immersive seat system 204. For example, although the user interface element 610 are illustrated, and are described as being associated with each of the respective seats 602, in other instances, functionality associated with user interface element 610, may be associated with a user device 620. For example, the occupant may control the outputs of the seats 602, e.g., the audio outputs and/or the haptic outputs from a personal device running an application associated with the vehicle in which the occupant is riding. Similarly, the immersive seating system may identify the occupant based at least in part on information obtained from the user device. In some implementations, the user devices 620 may also include devices of users who are not occupants of the vehicle. For example, a prospective user may request a ride via a personal electronic device, and information about that request may be used by the controller 612 to control aspects of an occupant's seat 602. For example, in an instance in which the non-occupant is to become an occupant, the controller 612 may configure outputs associated one of the seats 602, to prepare for arrival of the non-occupant. In other implementations, information about a ride request by a prospective rider may be used to control aspects of the seat 602 associated with a current occupant. For instance, an audio and/or haptic output may be provided at a seat 602 of a current occupant, alerting the occupant to the new ride request. Alerted to the request, the occupant may have control over whether the vehicle picks up the non-occupant, or denies the request for a ride.

The teleoperator 622 and the second vehicle 624 may be external systems to which the vehicle is in communication, e.g., via a network, such as a wireless network (not shown). In some implementations, the teleoperator 622 may provide instructions to the vehicle, and such instructions may be used by the controller 612 to control aspects of one or more of the seats 602. For example, the teleoperator may instruct the vehicle to take a new route because of construction, or some other obstacle, for example, the controller 612 may use this information to relay the change of direction to the occupant of the seat 602. Similarly, information from the second vehicle 624 could be used to control one or more of the seats 602. The second vehicle 624 may comprise a portion of a fleet of vehicles that also includes the vehicle having the immersive seat system 204. As with the teleoperator 622, the second vehicle 624 may provide information that would result in re-routing of the vehicle. Moreover, information from a second vehicle 624 may include user preferences stored on a second vehicle 624 for an occupant identified as occupying one of the seats 602. That is, information similar to the user profile data 614 may be stored on a second vehicle 624, instead of in association with the immersive seat system 204. In still other examples, information such as the user profile data 614 and/or the configuration data 616 may not be stored locally at the immersive seat system 204. Such data 614, 616 may instead be stored at a remote location, which may include the second vehicle 624, a host associated with the teleoperator, or the cloud, for example.

Figure 7:
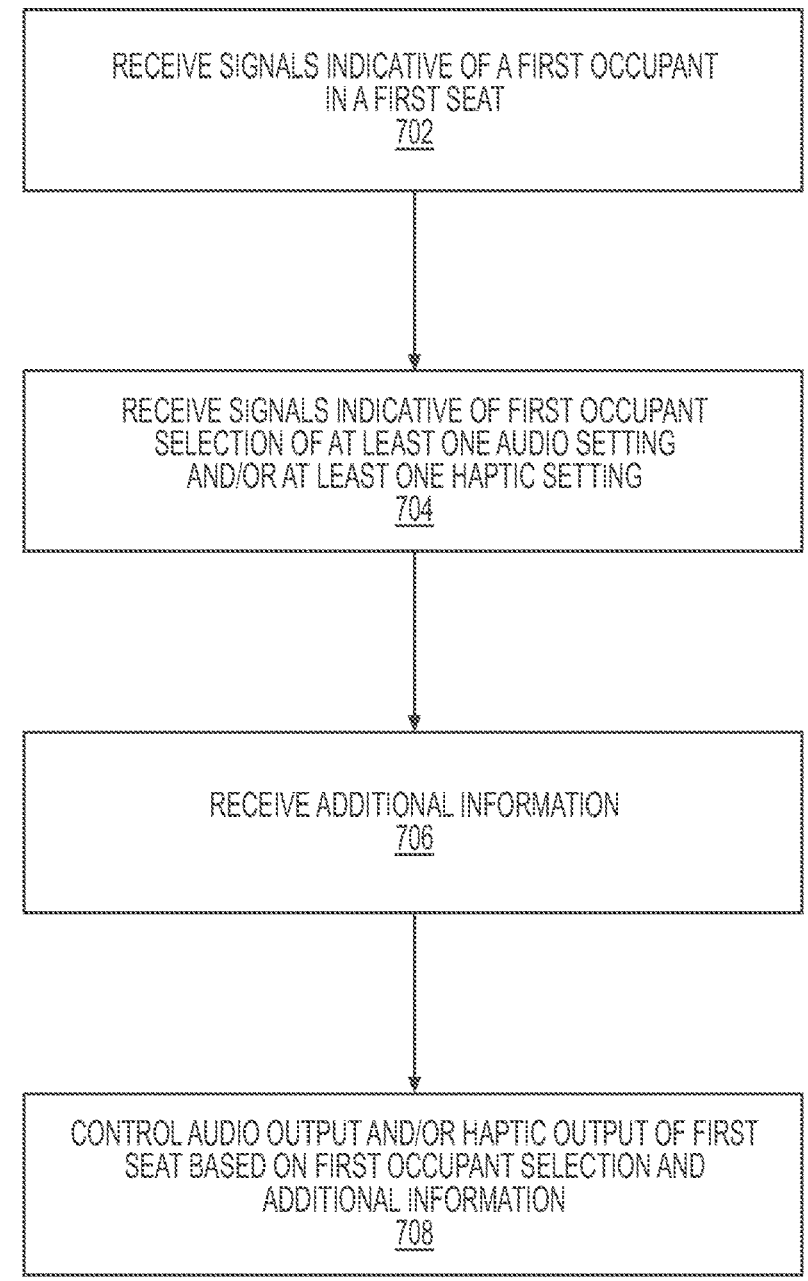
FIG. 7 is a flow diagram of an example process for controlling operation associated with an immersive seat system.
Figure 8:
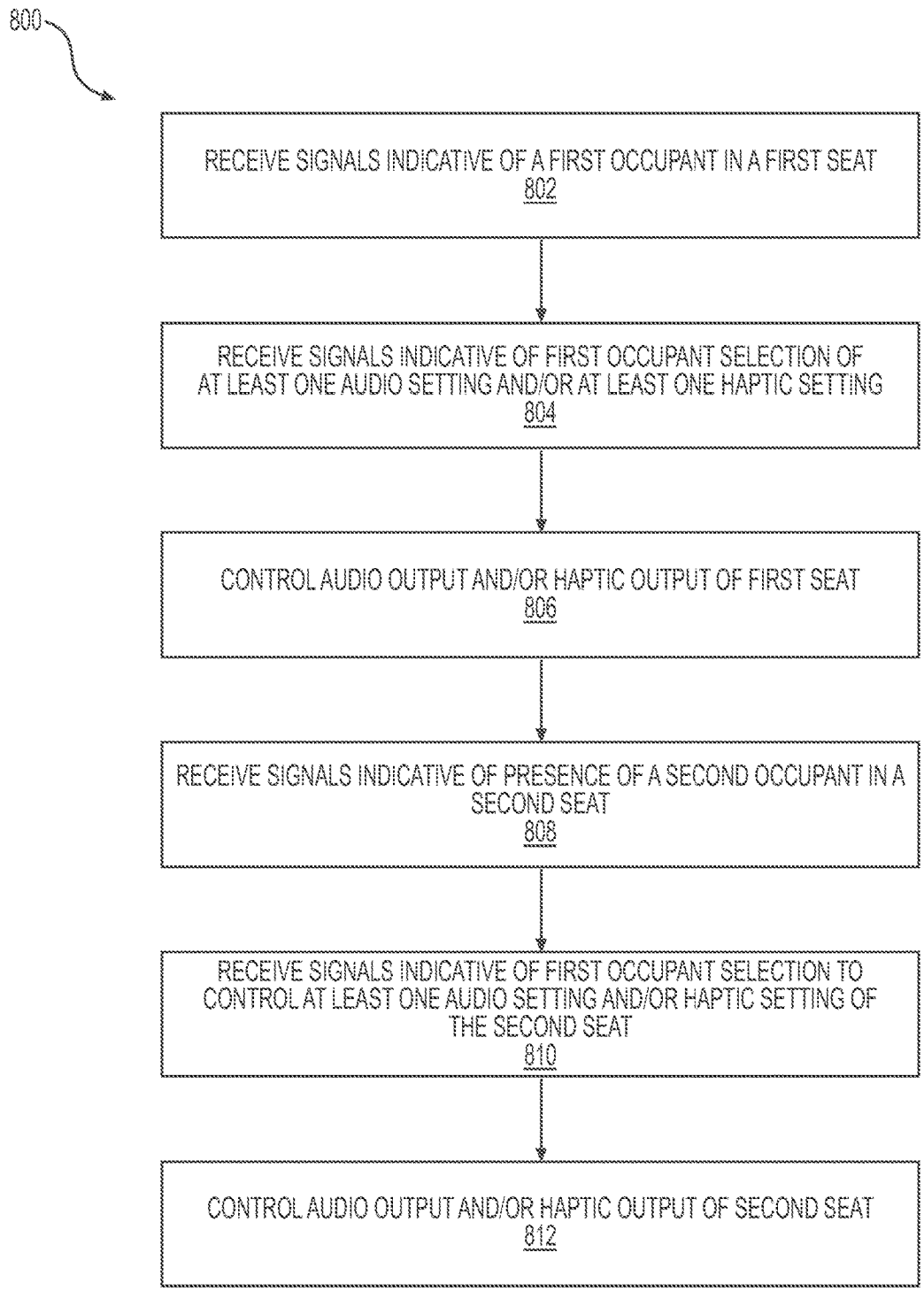
FIG. 8 is a flow diagram of another example process for controlling operation associated with an immersive seat system.

FIGS. 7 and 8 are flow diagrams illustrating example methods 700, 800 of controlling an immersive seat system in a vehicle, such as the immersive seat system 204 in the vehicle 202. The methods 700, 800 shown in FIGS. 7 and 8 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more processors or other components of the seat controller 232, 612 (described above)), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the methods 700, 800 are presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the methods 700, 800 may be practiced on or in conjunction with other computer system configurations beyond those described herein, including multiprocessor systems, microprocessor-based or programmable consumer electronics, minicomputers, mainframe computers, special-purposed hardware devices, network appliances, and the like.

FIG. 7 illustrates an example method 700 of controlling an immersive seats system. The method 700 may include, at 702, receiving signals indicative of a first occupant in a first seat. As detailed above, an immersive seating system according to aspects of this disclosure includes one or more seats in a vehicle. The seats may include presence detectors, which may pressure sensors or other sensors capable of determining that a passenger as occupying a seat. In addition to sensors integrated in the seats, systems according to this disclosure may also include one or more external sensors that may be used to determine whether a passenger as occupying a seat. For example, an imager may be used to visually confirm presence of the occupant. In some examples, other passenger generated signals (e.g., Wi-Fi, Bluetooth, or other signals from, for example, passenger smart devices) may be used additionally, or in the alternative, to identify or confirm the presence of a passenger. In some instances, the signals may also be indicative of an identity of the first occupant. For example, images taken by an imager may be used to recognize attributes of a specific occupant thereby identifying the passenger.

The method 700 also includes, at 704, receiving signals indicative of the first occupant selection of at least one audio setting and/or at least one haptic setting. As with step 704 of the example method 700 discussed above, at 704, signals may be received by user manipulation of one or user interfaces associated with seat, from an external device associated with the occupant, and or from some other source, such as one or more predetermined settings associated with the occupant, e.g., as user profile data 614.

At 706, the method 700 also includes receiving additional information. As discussed above, a controller associated with immersive seats according to embodiments of this disclosure may receive information from any number of different sources. Such information may be used to control the immersive seats in any number of ways. For instance, when audio and/or haptic outputs associated with seat are intended to convey information about aspects of the vehicle, such as, a path, trajectory, route, or the like, the controller may receive information from other portions of the vehicle systems that correspond to information that may be related to the occupant via the seat. In other examples, location data and/or perception data may be used to determine a proximity of the vehicle to the final destination of the occupant, and the controller may relay this information to the occupant via an output at the seat. In some instances, an audio output and/or haptic output may intensify, or otherwise change, as the destination is approached. The controller may also consider event sensor information, vehicle control data, information from a planner, or the like to determine the estimated time of arrival at the location, an estimated remaining duration, or the like. In other examples, an occupant of the vehicle may be apprised of a presence request to be picked up by the vehicle. For example, haptic outputs may alert the occupant to the ride request, and the occupant may be allowed to, via the user interface associated with the seat, accept or decline the ride request.

The method 700 also includes, at 708, controlling the audio output and/or haptic output of the first seat based on the first occupant selection and the additional information. In examples discussed above, the haptic output may be controlled to alert the occupant to events associated with the vehicle based on an occupant's input indicating his desire to be alerted to such events, and also based on the additional information received at 706.

As shown in FIG. 8, another example method 800 of controlling an immersive seating system may include, at 802, receiving signals indicative of a first occupant in a first seat. As detailed above, an immersive seating system according to aspects of this disclosure includes one or more seats in a vehicle. The seats may include presence detectors, which may include pressure sensors, seat belt sensors, or other sensors capable of determining that a passenger is occupying a seat. In addition to sensors integrated in the seats, systems according to this disclosure may also include one or more external sensors that may be used to determine whether a passenger is occupying a seat. For example, an imager may be used to visually confirm presence of the occupant. In some instances, the signals may also be indicative of an identity of the first occupant. For example, images taken by an imager may be used to recognize attributes of a specific user, thereby identifying the passenger. Presence of a passenger may also be determined by the passenger interacting with the immersive seating system, e.g., by selecting to control the immersive seating system. In still other embodiments, the autonomous vehicle may interact with a user device associated with the passenger to determine presence of the passenger, as well as preferences associated with the passenger. For instance, the passenger's device may be discovered by or be paired to the autonomous vehicle, e.g., via Bluetooth or other wireless protocol or via a physical interface, such as by physical connection of the device to the autonomous vehicle. This pairing could confirm presence of the user in the seat and/or be used to configured aspects of the seat according to the preferences of the passenger.

The method 800 may also include, at 804, receiving signals indicative of a selection of at least one audio setting and/or at least one haptic setting. In examples of this disclosure, the occupant, once detected, may be able to configure outputs from the seat. For instance, user interface elements may be provided at the seat for manipulation by the occupant. In some implementations, the occupant may use user interface elements to select conventional audio settings, such as volume, bass, treble, and other acoustic attributes, as well as an audio source. Moreover, the occupant may select one or more haptic settings. For instance, an occupant may select to activate only certain of available haptic outputs. In some implementations, for example, the occupant may decide that only haptic outputs associated with the seat portion, the seat back, or the headrest may be desirable. The user may also or alternatively select to receive haptic outputs for entertainment/comfort purposes and/or to receive information, including information about the occupant's journey. Such selections may be made using the user interface elements. In other implementations, the selections may be made by the occupant via an input device separate from the seat. By way of non-limiting example, the occupant may, via an application or other program running on a personal device and communicatively coupled to the seat, control aspects of the seat.

Some example selections that may be made by the occupant of the vehicle may include a selection to synchronize one or more of the haptic outputs with an audio output. For instance, an occupant may decide that in addition to listening to an audio source, it may be desirable to have a haptic output that correlates to the audio output. By way of non-limiting example, one or more of the haptic outputs may be controlled to provide a tactile response in time with a tempo or beat associated with an audio output. In this manner, the occupant may have a more robust listening experience while traversing to a destination in the vehicle.

In other examples of this disclosure, an occupant may select a setting that apprises the occupant of goings-on associated with the vehicle via sound and/or haptic output. For example, an occupant may desire to get updates about his trip via an audio output and/or a haptic output. According to embodiments of this disclosure, such settings may be personalized for each occupant in such a manner that other occupants do not receive the same information. For example, when multiple passengers are present in the vehicle, one passenger may desire to have minimal noise and distraction, whereas a second occupant may desire a guided tour along the route. Aspects of this disclosure allow for occupants of the same vehicle to have their desired, individualized occupant experience.

The method 800 may also include, at 806, controlling audio output and/or haptic output associated with the first seat. For instance, a controller, such as the seat controller 232 or the controller 612 may control the audio output and/or haptic output in accordance with the signals indicative of the first occupant selection received at 804. For example, the controller may control the audio played at the seat in accordance with occupant preferences for volume, source and the like. Moreover, the controller may control the haptic outputs in accordance with the occupant selection. In some instances of this disclosure, an occupant may desire to receive haptic outputs associated with events associated with the vehicle. In this manner, the controller may use additional information from one of many sources, such as those illustrated in FIG. 6, to appropriately control the haptic outputs. By way of non-limiting example, if the occupant desires to receive information specific to the occupant's trip, the controller may control the haptic output to provide information about a remaining duration of the trip. In some instances, the controller may control the haptic output to provide a sequence or pattern of tactile sensations at one of more portions of the seat. For instance, when the vehicle is approaching the final destination of the occupant, such as may be detected by a camera or perception system on the vehicle, one or more haptic outputs may be used to convey this to the occupant. For example, haptic outputs associated with the seat portion, the back portion, and/or the headrest of the seat may be controlled to provide a distinctive tactile sensation such as a series of distinctive vibrations corresponding in number with a number of miles, minutes, or blocks remaining in the trip. Moreover, haptic outputs associated with the seat portion of the seat may be controlled to provide an unpleasant output, prompting the occupant to vacate the seat. In this instance, haptic outputs may suggest that the occupant vacate the vehicle upon arrival at the occupant's destination.

Similarly, tactile sensations may be created for the occupant to correspond with other events of the vehicle. For instance, an occupant may be alerted via a tactile sensation of a request by another passenger to reroute the vehicle or of a request by a non-passenger to be picked up. In other implementations, audio and/or haptic outputs may be used to convey information about potential or imminent danger associated with the vehicle. For instance, an occupant may be alerted to a potential impact of the vehicle with some external object via the haptic and/or audible outputs. As will be appreciated from the foregoing, the audio and haptic elements of the immersive seats according to aspects of this disclosure may be controlled to enhance an occupant experience by providing pleasant audio and tactile outputs and/or by conveying customizable information to the occupant.

The method 800 may also include, at 808, receiving signals indicative of presence of a second occupant in a second seat of the vehicle. Like in step 802, discussed above, the signals may originate from the seat itself, or from some other source providing information about the second seat.

At 810, the method 800 also includes receiving signals indicative of a first occupant selection to control at least one audio setting and/or one haptic setting of the second seat. In some examples, the method 800 may allow an occupant to share an experience with one or more additional occupants of the vehicle. For instance, two occupants may be traveling together and according to implementations of this disclosure, one of the occupants may be able to share, e.g., by input to the user interface elements, the settings associated with her seat. In this manner, two passengers traveling to the same location may receive similar updates along the journey, but without bothering other additional passengers who may be going to a different location. In some examples, the method may further receive signals indicative of a second occupant's confirmation of the signals. For instance, a second occupant may not want to engage in a shared experience. In such instances, the second passenger may select (e.g., by input to the user interface elements) a preference not to engage in a shared experience.

At 812, the method 800 includes controlling the audio output and/or the haptic output of the second seat. For example the controller, such as controller 612 may control the second seat in the same manner in which it controls the first seat based on the signals received at step 810.

As described above, aspects of the present disclosure may be used to enhance a passenger's experience, for example, while riding in an autonomous vehicle. In some examples, the audible and/or haptic outputs are used to convey information and/or to provide entertainment to the passenger. In embodiments, the experience provided by the audible and/or haptic outputs may be unique to a specific passenger, despite the presence of additional passengers in the vehicle. For instance, audible and/or haptic outputs may be limited to, or customized for, the specific seat occupied by the passenger.

In other implementations, a first passenger may be able to share their experience, e.g., by sharing the settings with one or more other passengers in other seats. For instance, a first passenger may be alerted to the fact that other passengers are in the vehicle, and may be prompted about preferences to share experiences with those other passengers. For example, when a passenger sits, a user interface associated with the seat, which may be a part of the vehicle or may be a personal user device associated with the user, may allow a user to select one or more additional passengers with whom they would like to have a shared experience. By way of non-limiting example, the user interface may allow the user to specify one or more passengers with whom to have a shared experience, and to specify whether the user would like to adopt settings associated with one of the other passengers or share settings with the other passenger(s). In response to the request for a shared experience, the other passenger(s) may be alerted to the request, e.g., via a haptic, an audio and/or a visual prompt at their seat. In some examples, a haptic and/or an audio output may signal a second passenger to interact with an associated user interface to either accept or deny the request for shared experience. If the second passenger denies the request, the first passenger may be alerted via audio, haptic, and/or video output of the denial. If the second passenger accepts the request, however, the seats may be linked, e.g., via communication networks or the like, to synchronize the experiences, e.g., by synchronizing audio and/or haptic outputs from the seats. In some implementations, acceptance by the second passenger may also prompt association, e.g., by one or more communication links, of electronic devices associated with the seats and/or the passengers. For example, such electronic devices may be running an application associated with the environment and/or the vehicle, and synchronizing the seats may promote linking of the devices via the application, e.g., to allow for messaging, sharing, and/or other common functionality between the devices. In other implementations, devices in the vehicle may be linked before a shared experience is requested and/or approved. For example, all devices in the vehicle may be linked automatically, to allow passengers to request and/or respond to requests for shared experiences via an application running on the devices. Similarly, affiliated groups of people may allow their devices to be linked, e.g., to create a shared experience between a group of colleagues or friends. In the foregoing examples, any of the processes may have associated audible and/or haptic outputs. For example, haptic and/or audible outputs may be used to signal messages received or sent via an application, linking or other associations of seats, experiences, or devices, and/or requests or responses to requests to create a shared experience.

The above disclosure includes several example uses of the systems and methods described herein. Those examples are not exhaustive. Additional examples are discussed below, and still further examples will be appreciated by those having ordinary skill in the art with the benefit of this disclosure.

As noted above, in some implementations, an autonomous vehicle may include one or more vehicle sensors, perception systems, a planner, an object data calculator, an object classifier, a collision predictor system, and/or a kinematics calculator. As described with respect to FIG. 5, these components may be used to determine a presence of an object in an environment of the vehicle and/or to determine data about the object, to classify the object, to determine a likely course of action for the object, and/or to determine one or more courses of action for the autonomous vehicle based on any or all of the foregoing. According to implementations of this disclosure, similar information may be used to control immersive seats of the vehicle. For instance, haptic and/or audible outputs may be output depending upon the type and/or classification of an object sensed in the environment of the vehicle. For example, different outputs may be associated with pedestrians, animals, different types of animals, bicyclists, other vehicles, landmarks, points of interest, and the like. The outputs may also may be varied based on a detected action associated with the object and/or a location of the object. For instance, haptic and/or audible output(s) may vary depending on whether a person is walking, jogging, or standing still, for example. In still further examples, a haptic output may alert a user to a presence of a point of interest, and an audible output may provide additional information about the point of interest.

Moreover, haptic elements in the seat may be used to convey a location of the object. For example, as noted above, each seat may include multiple haptic elements arranged to provide tactile sensations perceptible at various portions of the seat. When a detected object is located to the right of the seat, a controller may control the haptic elements to provide a tactile sensation on a right side of the seat. Other locations may similarly be conveyed using the haptic elements. In addition to conveying information about a type of an object, a classification of an object, and/or a location of the object, e.g., using perception data, implementations of this disclosure may convey information about a distance to the object. For instance, a distance between the object and the vehicle may be calculated and conveyed using haptic outputs. Moreover, as the distance changes, the haptic output may change. For example, an intensity or frequency of the haptic output may be correlated with the distance.

Other information that may conveyed using implementations of this disclosure may include environmental conditions. For instance, when sensors associated with the vehicle determine certain attributes either outside or inside the vehicle, the change may be conveyed via haptic and/or audio outputs. As one example, when information from sensors indicates that it is raining, speakers may output a sound of raindrops falling. Similarly, when information from sensors indicates that people are talking in the vehicle, conversational sounds may be played to the passenger.

In additional embodiments, the haptic and/or audio elements may be useful for interacting with other passengers. As discussed above, passengers may be able to create shared experiences by informing settings for other seats in the vehicle. In other implementations, passengers may input a request to get the attention of another rider, e.g., via input to a user interface associated with the seat. In response to the request, the controller may instruct an audio and/or haptic output at another passenger's seat, alerting the second passenger to the first passenger's desire to get his attention.

As discussed above, the haptic and/or audio outputs may be varied based on passenger configuration. In some implementations, the passenger may be provided with several pre-configured output options among which to choose. For instance, the passenger may be provided with configurations that are haptic-only outputs, audio-only outputs, or combined outputs. A pre-configured option that provides information about the environment in which the passenger is traversing may be particularly useful for a tourist. A pre-configured option that has upbeat music with coordinated haptics may be of interest to passengers headed to a party or club. For instance, haptics located throughout the seat may be controlled to coordinate with a bassline of a song being played, to give the passenger a sensation of the feeling the music.

In still other implementations, the haptic and/or audio output may be varied based on attributes of the seat and/or vehicle. In one non-limiting example, the vehicle may be a bi-directional vehicle, configured to drive forward in opposite directions. In such an arrangement, one or more seats in the vehicle may be configured to face in a first direction of travel and other seats may be configured to face in the opposite direction. For instance, seats may face each other, or they may be back-to-back. In such arrangements, the haptic and/or audio outputs may be configured differently for seats in which the passenger is travelling backward and for seats in which the passenger is travelling forward. For example, the passenger travelling backward may receive additional information or alerts about the goings-on around the vehicle. Moreover, the haptic and/or audio outputs may alert the passengers to the fact that the vehicle is changing course, and as a result, the passenger will now be travelling backward instead or forward, or vice versa.

Based on the foregoing, it should be appreciated that although the subject matter presented herein has been described in language specific to structural components of example vehicle systems, structural features of example controllers, methodological acts, computer readable media, and/or other structural components operably connected to the controllers, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method of controlling a vehicle seat in a vehicle, the vehicle seat comprising one or more haptic elements configured to provide a haptic output perceptible as a tactile sensation at a surface of the vehicle seat, the method comprising:
   receiving presence information indicative of an occupant occupying the vehicle seat;
   receiving a signal indicative of an input to a user interface, the input comprising a user selection associated with a haptic setting associated with the vehicle seat;
   determining an event, the determining the event comprising receiving, via one or more sensors associated with the vehicle, object information indicative of a presence of an object in an environment of the vehicle, and determining an object type associated with the object; and
   controlling the one or more haptic elements to produce the haptic output based at least in part on the object type.

2. The method of claim 1, further comprising determining a distance of the object from the autonomous vehicle, the haptic output being configured based on the distance.

3. The method of claim 2, wherein the distance comprises a first distance determined at a first time, the method further comprising:
   determining, at a second time subsequent to the first time, a second distance of the object from the autonomous vehicle; and
   altering the haptic output based at least in part on the second distance being different from the first distance.

4. The method of claim 1, further comprising receiving occupant information comprising a user profile associated with the occupant, the controlling the one or more haptic elements being based at least in part on the user profile.

5. The method of claim 1, the vehicle further comprising one or more speakers configured to provide an audio output audible to the occupant, the method further comprising:
   controlling the audio output based at least in part on the event.

6. The method of claim 1, wherein the controller is further configured to:
   receive at least one of:
      environmental information indicative of one or more attributes of an environment of the vehicle, or
      status change information indicative of a request to change a status of the vehicle, and
   controlling the one or more haptic elements to produce the haptic output based on the at least one of the environmental information or the status change information.

7. An autonomous vehicle comprising:
   a chassis;
   a body coupled to the chassis and defining at least a portion of an interior space;
   a seat disposed in the interior space;
   one or more speakers configured to emit sound audible to an occupant of the first seat, and
   one or more haptic elements disposed in the seat and configured to provide a tactile output at a surface of the seat; and
   a controller configured to:
      receive information comprising status information indicative of a status of the autonomous vehicle, the information indicative of the status comprising at least one of information about a distance of the vehicle from a destination or information about an estimated time until the vehicle arrives at the destination,
      determine an event based at least in part on the information,
      control at least one of the one or more speakers or the one or more haptic elements based at least in part on the event, the one or more haptic elements being controlled to provide a haptic output comprising a pattern of tactile sensations corresponding in number to the distance or the estimated time.

8. The autonomous vehicle of claim 7, wherein the controller is configured to coordinate the one or more haptic elements with the sound emitted from the one or more speakers.

9. The autonomous vehicle of claim 7, wherein the controller is further configured to identify the occupant and retrieve a profile associated with the occupant, the profile including occupant preference information.

10. The autonomous vehicle of claim 7, further comprising one or more sensors coupled to the chassis and configured to sense one or more objects in the environment, wherein the information comprises environmental information and the environmental information comprises object information indicative of at least one of a type of an object of the one or more objects or a location of the object.

11. The autonomous vehicle of claim 7, wherein the seat is a first seat, the autonomous vehicle further comprising a second seat, the second seat comprising a second haptic element, wherein the controller is further configured to receive an instruction from the first seat, and based on the instruction from the first seat, to control the second haptic element.

12. The autonomous vehicle of claim 11, wherein the controller is configured to control the first haptic element and the second haptic element to provide a coordinated haptic output at the first seat and at the second seat.

13. The autonomous vehicle of claim 7, further comprising one or more sensors disposed in the interior space and configured to output information about the presence of an occupant in the seat.

14. The autonomous vehicle of claim 7, wherein the autonomous vehicle is a bi-directional vehicle configured to drive forward in a first direction and forward in a second direction opposite the first direction and the controller is configured to control the at least one of the one more speakers or the one or more haptic elements in a first manner when the autonomous vehicle drives forward in a first direction and in a second manner when the autonomous vehicle drives forward in the second direction.

15. The autonomous vehicle of claim 7, a first speaker of the one or more speakers and a first haptic element of the one or more haptic elements are disposed in a headrest of the seat, and audio output by the first speaker is configured to be perceptible substantially only by the occupant.

16. The autonomous vehicle of claim 7, wherein the controller is further configured to receive occupant preference information indicative of one or more preferences of an occupant of the seat.

17. A method of controlling a plurality of passenger seats in an autonomous vehicle, the autonomous vehicle comprising at least one sensor disposed to sense a presence of a first passenger in a first passenger seat of the plurality of passenger seats and a presence of a second passenger in a second passenger seat of the plurality of passenger seats, one or more first haptic elements for providing a first tactile sensation perceptible to the first passenger and one or more second haptic elements for providing a second tactile sensation perceptible to the second passenger, and one or more audio elements for providing an audio output perceptible to at least one of the first passenger or the second passenger, the method comprising:
   detecting the presence of the first passenger in the first passenger seat;
   detecting the presence of the second passenger in the second passenger seat;
   based at least in part on detecting the presence of the first passenger, determining preferences associated with the first passenger, the preferences comprising a haptic output preference and an audio output preference;
   determining an event associated with the vehicle; and
   based at least in part on the event, controlling the one or more first haptic elements, the one or more second haptic elements, and the one or more audio elements in accordance with the preferences to provide a shared experience at the first passenger seat and the second passenger seat.

18. The method of claim 17, further comprising determining an identity associated with the first passenger, wherein the preferences are stored in a profile associated with the identity.

19. The method of claim 18, wherein the determining the identity comprises at least one of:
   determining the identity based on images taken by an imager associated with the autonomous vehicle;
   identifying a unique identifier associated with the first passenger;
   receiving information from a device associated with the first passenger; or
   receiving an input from the first passenger.

20. The method of claim 17, wherein the providing the shared experience comprises generating a same tactile sensation as the first tactile sensation and the second tactile sensation.

* * * * *